July 20, 1948.    H. D. HURT    2,445,355
HEAD GEAR FOR OPTICAL DEVICES
Filed Jan. 28, 1946    2 Sheets-Sheet 1
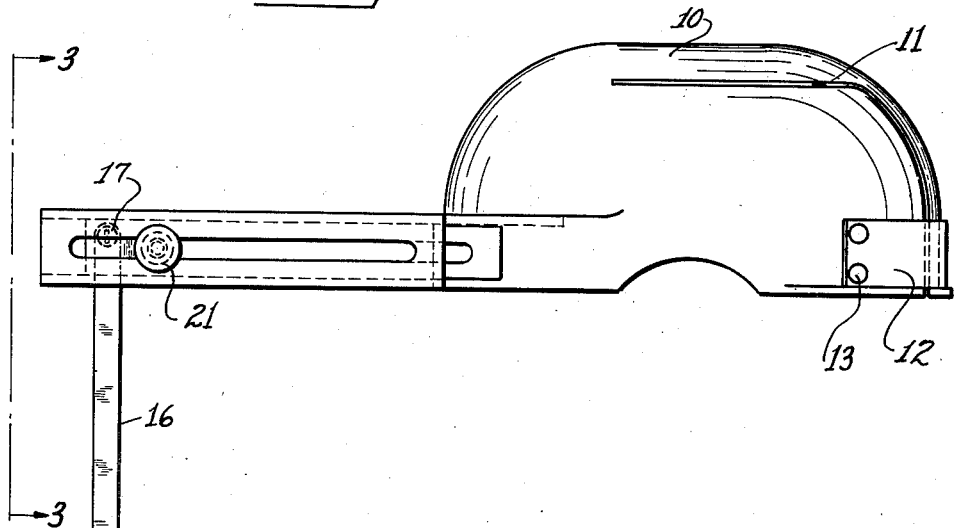
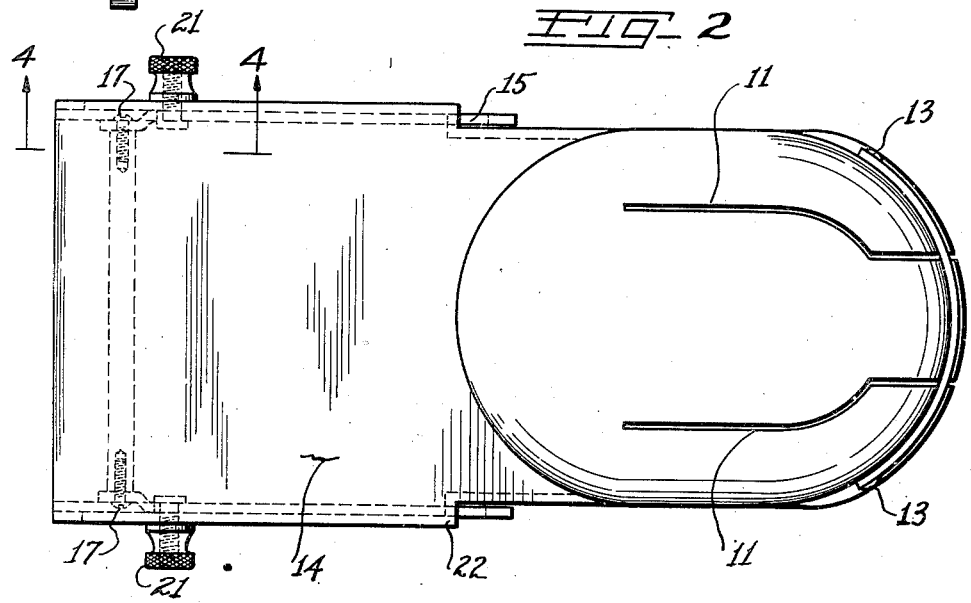
INVENTOR.
Hansford D. Hurt July 20, 1948.  H. D. HURT  2,445,355
HEAD GEAR FOR OPTICAL DEVICES
Filed Jan. 28, 1946  2 Sheets-Sheet 2
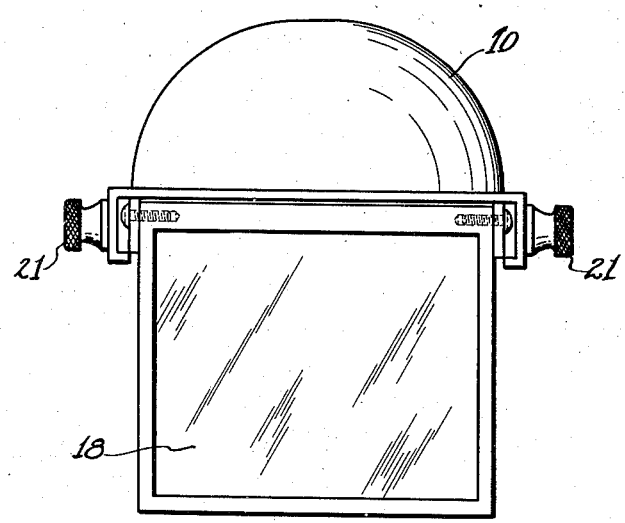
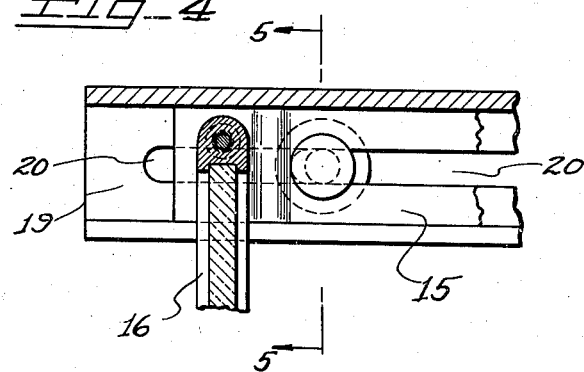
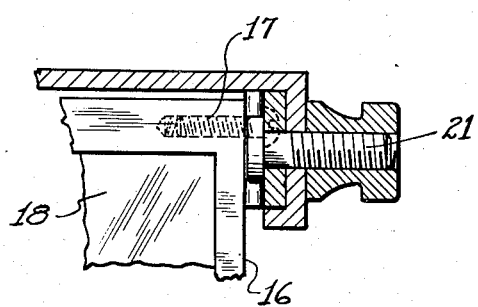
INVENTOR.
Hansford D. Hurt Patented July 20, 1948

2,445,355

UNITED STATES PATENT OFFICE 2,445,355

HEADGEAR FOR OPTICAL DEVICES

Hansford D. Hurt, Los Angeles, Calif.

Application January 28, 1946, Serial No. 643,928

2 Claims. (Cl. 2—10)

This invention is an improvement in portable supporting means for optical devices and particularly to the type wherein supporting means is carried on the wearer's head and having optical devices carried thereon.

The main object of my invention is to provide a headgear to be automatically adjusted in size to the wearer's head and having supporting means, forming the visor, for the carrying and adjustment of optical devices such as a magnifying glass, polarized anti-glare lens, a combination eye and face shield for cyclists and/or hazardous shopwork or which can be adapted to hold binoculars or the like.

Another object is to provide a head gear of such resilient material that a limited number of sizes can be made to fit all sizes of heads, the head gear having a visor of light and sturdy material into which adjustable means are provided to carry any type of optical devices.

A further object is to provide a head gear that is light in weight, self adjusting and inexpensive yet affording quick adjustment of the optical device used, either in operative or unoperative position at will.

Other objects and advantages will become apparent as the description progresses and as shown in the accompanying drawings in which:

Figure 1 is a full side elevation of my invention with optical glass shown in place;

Figure 2 is a full plan view of my invention,

Figure 3 is a full front elevation as taken on line 3—3 of Figure 1,

Figure 4 is a fragmentary sectional view as taken on line 4—4 of Figure 2,

Figure 5 is a cross sectional view as taken on line 5—5 of Figure 4.

Referring more particularly to the drawing 10 is a cap portion having slits 11—11 provided to allow for the expansion of said cap portion when the user's head is slightly larger than the cap portion 10 provided an elastic band 12 is fixedly attached to the cap portion by means designated as rivets 13—13. This elastic band will hold the slit sections in close approximation to the actual cap portion size still allowing expansion when necessary.

The visor portion 14 of the head gear is made integral with the cap portion 10 of a width equal to the width of said cap portion and extends forward of same to allow reasonable adjusting length, and the sides of which are greater than cap width and are turned downwardly to provide a slide for the optical glass adjusting bars 15—15 onto the ends of which the optical glass frame 16 is fastened by the screws 17—17 with enough frictional tension to hold the lens frame in vertical, horizontal, or intermediate positions. 18 is the optical glass fitted and held in said frame 16. The optical glass adjusting bars 15—15 and the visor sides 19—19 have slots 20—20 of identical width to allow the slide locking screws 21—21 to slide therein.

The ends 22—22 of visor sides are slotted to allow passage of adjusting bars 15—15 when short adjustment is required.

While one embodiment of my invention has been disclosed, it will be understood that the generic idea may be accomplished in various ways. Therefore this application is not to be limited to the precise details described, but is intended to cover all variations and modifications thereof that fall within the spirit of my invention as set forth in the appended claims.

What I claim is:

1. A head gear for optical devices comprising a cap section, a forwardly extending visor section integral therewith and formed with downwardly extending parallel side sections, said side sections having elongated slots therein, and a transverse optical device extending downwardly from said visor section and supported in said slots to be adjusted longitudinally.

2. A head gear for optical devices, comprising a cap section, a forwardly extending visor section integral therewith and formed with downwardly directed and forwardly parallel side sections, said side sections having forwardly extending slots therein, adjusting bars supported on said side sections and slidable longitudinally on said side sections, an optical device pivotally supported on said bars to be varied in forward angularity, and clamping means for holding said bars and said optical device in adjusted position.

HANSFORD D. HURT.

REFERENCES CITED

The following references are of record in the file of this patent:

UNITED STATES PATENTS

| Number | Name | Date |
|---|---|---|
| 624,369 | McLernon | May 2, 1899 |
| 1,502,108 | McWilliam | July 22, 1924 |
| 1,875,143 | Punton | Aug. 30, 1932 |
| 2,144,870 | Bullard | Jan. 24, 1939 |
| 2,269,322 | Serr | Jan. 6, 1942 |
| 2,301,050 | Kelley | Nov. 3, 1942 |
| 2,391,335 | O'Brien | Dec. 18, 1945 |